US012597963B2

(12) United States Patent
Ishido et al.

(10) Patent No.: US 12,597,963 B2
(45) Date of Patent: Apr. 7, 2026

(54) COMMUNICATION SYSTEM, COMMUNICATION METHOD, AND RADIO WAVE REFRACTING PLATE INSTALLATION METHOD

(71) Applicant: KYOCERA Corporation, Kyoto (JP)

(72) Inventors: Ryo Ishido, Yokohama (JP); Nobuki Hiramatsu, Yokohama (JP); Masamichi Yonehara, Yokohama (JP); Takafumi Uehama, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 478 days.

(21) Appl. No.: 18/248,385

(22) PCT Filed: Oct. 22, 2021

(86) PCT No.: PCT/JP2021/039176
§ 371 (c)(1),
(2) Date: Apr. 10, 2023

(87) PCT Pub. No.: WO2022/091986
PCT Pub. Date: May 5, 2022

(65) Prior Publication Data
US 2023/0379010 A1 Nov. 23, 2023

(30) Foreign Application Priority Data

Oct. 30, 2020 (JP) ................................. 2020-183310

(51) Int. Cl.
*H04B 7/04* (2017.01)
*H04W 16/26* (2009.01)
(52) U.S. Cl.
CPC ........ *H04B 7/04013* (2023.05); *H04W 16/26* (2013.01)

(58) Field of Classification Search
CPC .............. H04B 7/04013; H04W 16/26; H04W 84/047; H01Q 15/0086; H01Q 15/02; H01Q 15/12; H01Q 15/14
See application file for complete search history.

(56) References Cited

U.S. PATENT DOCUMENTS

| | | | | |
|---|---|---|---|---|
| 2005/0260983 A1 | 11/2005 | Dipiazza | | |
| 2010/0033390 A1 | 2/2010 | Alamouti et al. | | |
| 2011/0045764 A1 | 2/2011 | Maruyama et al. | | |
| 2018/0159244 A1* | 6/2018 | Tzuang | ................. | H01Q 3/245 |
| 2019/0058257 A1* | 2/2019 | Song | ...................... | H01Q 15/04 |
| 2020/0275517 A1* | 8/2020 | Ashrafi | ................. | H04W 76/22 |

FOREIGN PATENT DOCUMENTS

| | | |
|---|---|---|
| JP | H4-207606 A | 7/1992 |
| JP | 2009-153095 A | 7/2009 |
| JP | 2017-17643 A | 1/2017 |
| WO | 2019/198702 A1 | 10/2019 |

OTHER PUBLICATIONS

WO 2019/198702 Machine level English translation EPO.*

* cited by examiner

*Primary Examiner* — Fayyaz Alam
(74) *Attorney, Agent, or Firm* — HAUPTMAN HAM, LLP

(57) ABSTRACT

A communication system includes a base station configured to transmit and receive a radio wave, and a radio wave refracting plate configured to refract the radio wave transmitted from the base station at a predetermined angle to emit a refractive radio wave, when the radio wave passes through the radio wave refracting plate.

18 Claims, 10 Drawing Sheets

1

1

1

COMMUNICATION SYSTEM, COMMUNICATION METHOD, AND RADIO WAVE REFRACTING PLATE INSTALLATION METHOD

RELATED APPLICATIONS

The present application is a National Phase of International Application Number PCT/JP2021/039176 filed Oct. 22, 2021, which claims the benefit of priority from Japanese Patent Application No. 2020-183310, filed on Oct. 30, 2020.

TECHNICAL FIELD

The present disclosure relates to a communication system, a communication method, and a radio wave refracting plate installation method.

BACKGROUND OF INVENTION

When high-speed communication is performed in a collective housing such as an apartment building, a wired connection using an optical line or the like, or a FWA (fixed wireless access) utilizing public LTE is utilized (e.g., Patent Document 1).

CITATION LIST

Patent Literature

Patent Document 1: JP 2017-17643 A

SUMMARY

Problem to be Solved

Here, in order to draw an optical line indoors, a work for making a hole in the wall in a house is required. The installation of the FWA may cause a poor communication performance when visibility from the base station is poor. A radio wave increases straight advancing ability thereof as the frequency increases. The more the 5G of 28 GHz band capable of large-capacity communication is used, the more the visibility from the base station is required. A location where the visibility of the base station is poor may be an out-of-coverage area, in which communication may be impossible or unstable. There is a need to stably perform large-capacity communication such as the 5G of high frequency even at the location where the visibility of the base station is poor.

An object of the present disclosure is to provide a communication system, a communication method, and a radio wave refracting plate installation method capable of appropriately performing communication using millimeter waves even in an out-of-coverage area.

Solution to Problem

In an aspect of the present disclosure, a communication system includes a base station configured to transmit and receive a radio wave, and a radio wave refracting plate configured to refract the radio wave transmitted from the base station at a predetermined angle to emit a refractive radio wave, when the radio wave passes through the radio wave refracting plate.

In an aspect of the present disclosure, a communication method includes transmitting and receiving a radio wave, and refracting a radio wave transmitted at a predetermined angle to emit a refractive radio wave, when the transmitted radio wave passes through.

In an aspect of the present disclosure, a communication method includes transmitting and receiving a radio wave, and refracting the radio wave at a predetermined angle to emit a refractive radio wave from an outdoor space to an indoor space, when the transmitted radio wave passes through.

In an aspect of the present disclosure, a communication method includes transmitting and receiving a radio wave, refracting the radio wave at a predetermined angle to emit a first refractive radio wave, when the transmitted radio wave passes through, and refracting at least a part of the first refractive radio wave in a direction toward a room in an indoor space as a second refractive radio wave, and passing a remaining part of the first refractive radio wave as a passed-through radio wave.

In an aspect of the present disclosure, a radio wave refracting plate installation method includes installing a radio wave refracting plate at a position visible from positions of a base station and a relay apparatus, the radio wave refracting plate being configured to refract a radio wave transmitted from the base station at a predetermined angle to emit a refractive radio wave, when the radio wave passes through the radio wave refracting plate, and the relay apparatus being configured to receive the refractive radio wave and transmit and receive data to and from a terminal apparatus to relay wireless communication between the base station and the terminal apparatus.

Advantageous Effect

According to the present disclosure, communication using millimeter waves can be appropriately performed even in an out-of-coverage area.

DESCRIPTION OF EMBODIMENTS

Figure 1:
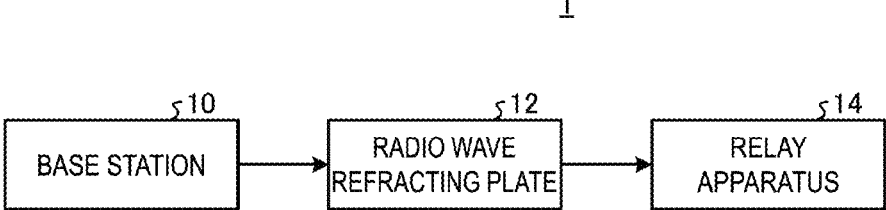
FIG. 1 is a block diagram illustrating a configuration example of a wireless communication system according to a first embodiment.

Embodiments of the present invention will now be described in detail with reference to the accompanying drawings. Note that the present invention is not limited by the embodiments, and when there are a plurality of embodiments, the present invention includes a combination of the embodiments. In the following embodiments, the same reference numerals are assigned to the same portions and redundant descriptions thereof will be omitted.

First Embodiment

A description is given of a communication system according to a first embodiment using FIG. 1. FIG. 1 is a block diagram illustrating a configuration example of a wireless communication system according to the first embodiment.

As illustrated in FIG. 1, a communication system 1 includes a base station 10, a radio wave refracting plate 12, and a relay apparatus 14. The communication system 1 may be, for example, a communication system supporting millimeter wave communication capable of performing large-capacity data communication in high speed, such as the fifth generation mobile communication system (hereinafter, also referred to as the "5G") or the sixth generation mobile communication system (hereinafter, also referred to as the "6G").

The base station 10 is a wireless communication apparatus configured to wirelessly communicate with the relay apparatus 14. The base station 10 is configured to wirelessly communicate with the relay apparatus 14 by transmitting and receiving radio waves (millimeter waves) corresponding to the 5G or the 6G, for example. In the first embodiment, the base station 10 is configured to wirelessly communicate with the relay apparatus 14 via the radio wave refracting plate 12. The base station 10 may be configured to communicate with a terminal apparatus such as a smartphone via the radio wave refracting plate 12 and the relay apparatus 14.

The radio wave refracting plate 12 is a plate-shaped member configured to be capable of passing the radio waves transmitted from the base station 10 through the radio wave refracting plate 12. The radio wave refracting plate 12 is configured to, for example, when receiving a radio wave transmitted from the base station 10, refract the radio wave at a predetermined angle to emit as a refractive radio wave. Specifically, the radio wave refracting plate 12 is configured to, when receiving a radio wave transmitted from the base station 10, refract the radio wave in a direction toward the relay apparatus 14 to emit to the relay apparatus 14. The radio wave refracting plate 12 may be made of, for example, a metamaterial that changes a phase of an incident light.

The relay apparatus 14 is a relay apparatus configured to receive radio waves transmitted from the base station 10 via the radio wave refracting plate 12. The relay apparatus 14 is configured to transmit the radio waves toward the base station 10 via the radio wave refracting plate 12, for example.

The relay apparatus 14 is configured to relay wireless communication between the base station 10 and a terminal apparatus (not illustrated), for example. The relay apparatus 14 is configured to perform millimeter wave communication for the 5G, the 6G, or the like, for example, with a terminal apparatus (not illustrated). The relay apparatus 14 may be configured to, for example, when receiving millimeter waves from the base station 10 via the radio wave refracting plate 12, change a communication scheme into Wi-Fi (trade name), Bluetooth (trade name), and the like to wirelessly communicate with the terminal apparatus. In other words, the relay apparatus 14 may be configured to wirelessly communicate with the terminal apparatus using the communication scheme the same as with the base station 10. The relay apparatus 14 may be configured to wirelessly communicate with the terminal apparatus using a communication scheme different from the communication scheme with the base station 10. The relay apparatus 14 may be configured to be connectable with the terminal apparatus by wire. The relay apparatus 14 may be CPE (Customer Premises Equipment) installed in a subscriber's housing/facility, and may include terminal equipment and a communication terminal.

Figure 2:
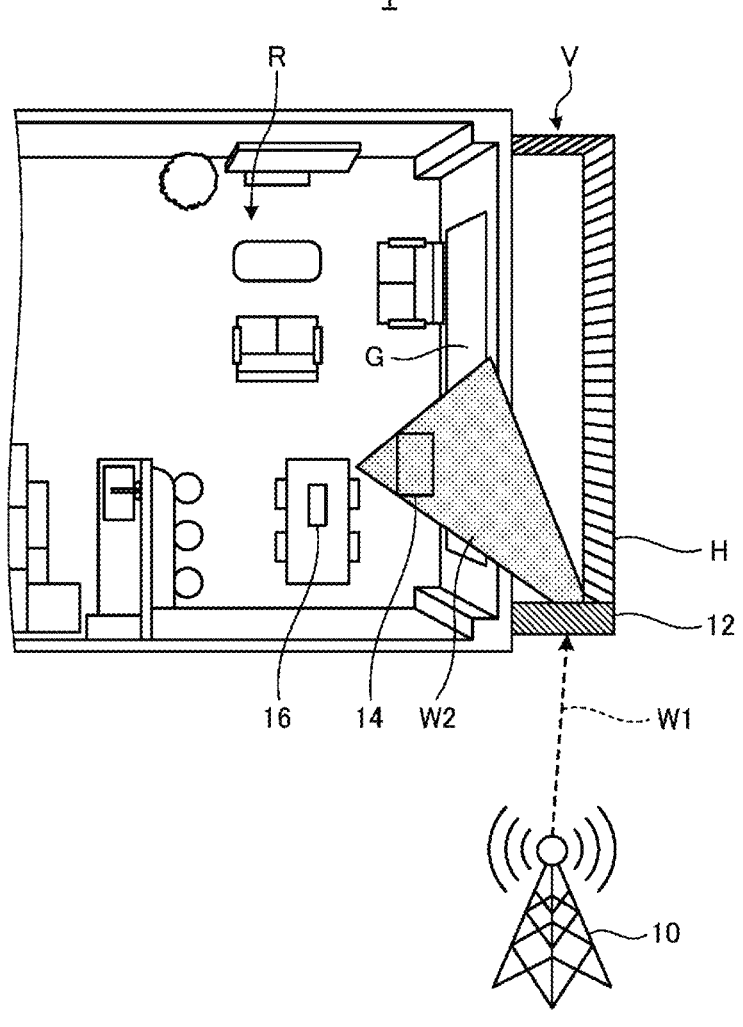
FIG. 2 is a diagram for describing an example of the wireless communication system according to the first embodiment.

A description is given of an example of the wireless communication system according to the first embodiment using FIG. 2. FIG. 2 is a diagram for describing an example of the wireless communication system according to the first embodiment.

The communication system 1 is configured to, for example, appropriately perform large-capacity communication in each room of a user in a collective housing or the like which is even a location where visibility of the base station 10 is poor. For example, when a communication system using millimeter waves for the 5G or the like is applied to the collective housing or the like, steel frames, columns, walls, floors, and the like may be obstacles. Thus, the millimeter waves are expected to be guided indoors from a large opening surface such as window glass. However, since a direction in which the window glass is installed in the collective housing or the like may be limited to one direction, it may be difficult to perform millimeter wave communication in the room depending on a positional relationship with the base station 10. In the first embodiment, the refractive radio wave obtained by refracting the radio wave from the base station 10 by use of the radio wave refracting plate 12 is relayed by the relay apparatus 14 through the window glass to enable millimeter wave communication in the room.

FIG. 2 includes a room R and a balcony V. The room R and the balcony V are examples of the room in the collective housing. In FIG. 2, the balcony V is in a service area of the base station 10, and the room R is in an out-of-coverage area of the base station 10.

The radio wave refracting plate 12 is installed outdoors. The radio wave refracting plate 12 is, for example, installed in the balcony V. The radio wave refracting plate 12 may be fixed to a handrail H or the like so as not to be blown by, for example, wind. The radio wave refracting plate 12 may be installed at a position where the relay apparatus 14 can be seen from the window glass G, for example. The radio wave refracting plate 12 may be installed, for example, such that a surface direction thereof is at a right angle with respect to a surface direction of the window glass G. The radio wave refracting plate 12 may include a mechanism, for example, capable of rotating in a horizontal direction or changing an elevation/depression angle. This makes it possible to adjust the direction of the radio wave after the radio wave refracting plate 12 is installed. The radio wave refracting plate 12 may be constructed to be, for example, installed inside a resin case and be able to rotate or incline inside the case. In this case, the direction of refraction of the radio waves can be adjusted while the radio wave refracting plate 12 is fixed so as not to be blown by wind or the like.

The radio wave refracting plate 12 may include, for example, a film. In this case, the radio wave refracting plate 12 may be attached to the window glass G outdoors or indoors.

The relay apparatus 14 is installed indoors. The relay apparatus 14 is installed in the room R. The relay apparatus 14 may be installed in various locations on a floor, wall, ceiling, furniture, or the like in the room R, for example. The relay apparatus 14 may be fixedly installed in the room R, for example. The relay apparatus 14 may be movably installed in the room R, for example.

A description is given of the positional relationship between the base station 10, the radio wave refracting plate 12, and the relay apparatus 14.

The radio wave refracting plate 12 is installed at a position capable of receiving a radio wave W1 transmitted from the base station 10, for example. The installation location of the radio wave refracting plate 12 may be set based on the position of the base station 10 and the installation location of the relay apparatus 14. The radio wave refracting plate 12 may be installed at a position where visibility when viewed from the base station 10 and the relay apparatus 14 is good, for example. In other words, the radio wave refracting plate 12 may be set at a position visible from the positions of the base station 10 and relay apparatus 14, for example. Specifically, the radio wave refracting plate 12 may be installed such that the surface direction of the radio wave refracting plate 12 is orthogonal to an incident direction of the radio wave W1 from the base station 10. In other words, an angle of the radio wave refracting plate 12 with respect to the base station 10 may vary depending on the relationship between the position of the base station 10 and the position where the radio wave refracting plate 12 is installed. For example, when the radio wave refracting plate 12 is installed in each room of the collective housing, the angle of the radio wave refracting plate 12 with respect to the base station 10 may vary from room to room.

The radio wave refracting plate 12 can refract the radio wave W1 from the base station 10 to emit as a refractive radio wave W2 through the window glass G toward the relay apparatus 14. The radio wave refracting plate 12 may be configured to, for example, amplify a signal level of the radio wave W1 from the base station 10 while refracting to emit the refractive radio wave W2. The radio wave refracting plate 12 may be configured, for example, such that the emitted refractive radio wave W2 obtained by refracting the radio wave W1 from the base station 10 converges at the position of the relay apparatus 14. The radio wave refracting plate 12 may be configured to amplify the signal level of the radio wave W1 while refracting with taking into consideration of an attenuation rate of the radio wave, when the window glass G is made of a glass having a relatively large attenuation rate of radio waves such as a heat absorbing glass or a heat reflecting glass, for example. When the attenuation rate of the radio waves of the window glass G is relatively large, an antireflection film to avoid reflection of the radio wave in the predetermined frequency band may be attached to the window glass G at least a portion between the radio wave refracting plate 12 and the relay apparatus 14.

The radio wave refracting plate 12 may be configured to, for example, when the wall of the room R is made of wood, refract the radio wave W1 from the base station 10 to emit as the refractive radio wave W2 through the wood wall toward the relay apparatus 14. In this case, the radio wave refracting plate 12 may be installed outdoors in the vicinity of the wood wall, for example. The radio wave refracting plate 12 may be configured, for example, such that the emitted refractive radio wave W2 obtained by refracting the radio wave W1 from the base station 10 converges at the position of the relay apparatus 14 through the wood wall of the room R.

The radio wave refracting plate 12 may be installed, for example, such that the surface direction thereof is in parallel with the surface direction of the window glass G. In this case, the radio wave refracting plate 12 can adjust the refractive angle of the refractive radio wave W2 with respect to the radio wave W1 from the base station 10 by, for example, rotating in a state of the surface of the radio wave refracting plate 12 facing the window glass G.

The radio wave refracting plate 12 may be configured to have characteristics set depending on the nature of the window glass G when the radio wave refracting plate 12 includes a film attached to the window glass G. The radio wave refracting plate 12 may be configured, for example, depending on reflective characteristics of the window glass G with respect to the radio wave W1 from the base station 10. The radio wave refracting plate 12 may be configured, for example, to cancel out a reflection of the radio wave W1 on the window glass G. Specifically, the radio wave refracting plate 12 may be configured such that, for example, a phase of a reflective wave from the window glass G with respect to the radio wave W1 and a phase of a reflective wave from the radio wave refracting plate 12 are opposite to each other.

An area of the radio wave refracting plate 12 is preferably configured to be larger than an antenna effective area of the relay apparatus 14. In other words, the radio wave refracting plate 12 is preferably configured to have the area formed larger to converge the refractive radio wave W2 to the relay apparatus 14. The radio wave refracting plate 12 is preferably configured such that an electrical power density at the position of the relay apparatus 14 is greater than an electrical power density at the position of the radio wave refracting plate 12. This increases a radio wave intensity that can be received by the relay apparatus 14 to allow stable communication. Therefore, a focal point at which the refractive radio wave W2 is converged is preferably on a straight line connecting the radio wave refracting plate 12 and the relay apparatus 14, and closer to the relay apparatus 14 than a midpoint between the radio wave refracting plate 12 and the relay apparatus 14. The focal point of the refractive radio wave W2 may be closer to an inner side of the room than the relay apparatus 14. A length of one side of the radio wave refracting plate 12 is preferably configured to be smaller than $2L \cdot \tan(w)$ where w (deg) represents a half width of an antenna (not illustrated) of the base station 10 and L (m) represents a distance between the base station 10 and the radio wave refracting plate 12.

The radio wave refracting plate 12 may be configured to refract the radio wave W1 from the base station 10 to emit as the refractive radio wave W2 toward the relay apparatus 14, regardless of the frequency of the band of the radio wave W1 from the base station 10. A plurality of radio wave refracting plates 12 may be installed depending on the frequency of the band.

The radio wave refracting plate 12 may include unit structures (elements) two-dimensionally arranged on a plane. The unit structures may be arranged such that the phase changes along a direction A when the radio wave W1 from the base station 10 passes through the radio wave refracting plate 12. The direction A may be a direction parallel to a plane including, as sides, a straight line connecting the base station 10 and the radio wave refracting plate 12, and a straight line connecting the radio wave refracting plate 12 and the relay apparatus 14. The radio wave refracting plate 12 may change the frequency band of the radio wave of which the phase is to be changed and an amount of change in the phase, depending on such as a size and shape of the unit structure, for example. In other words, in the first embodiment, the refractive angle can be adjusted by changing the size and shape of the unit structure.

Figure 3:
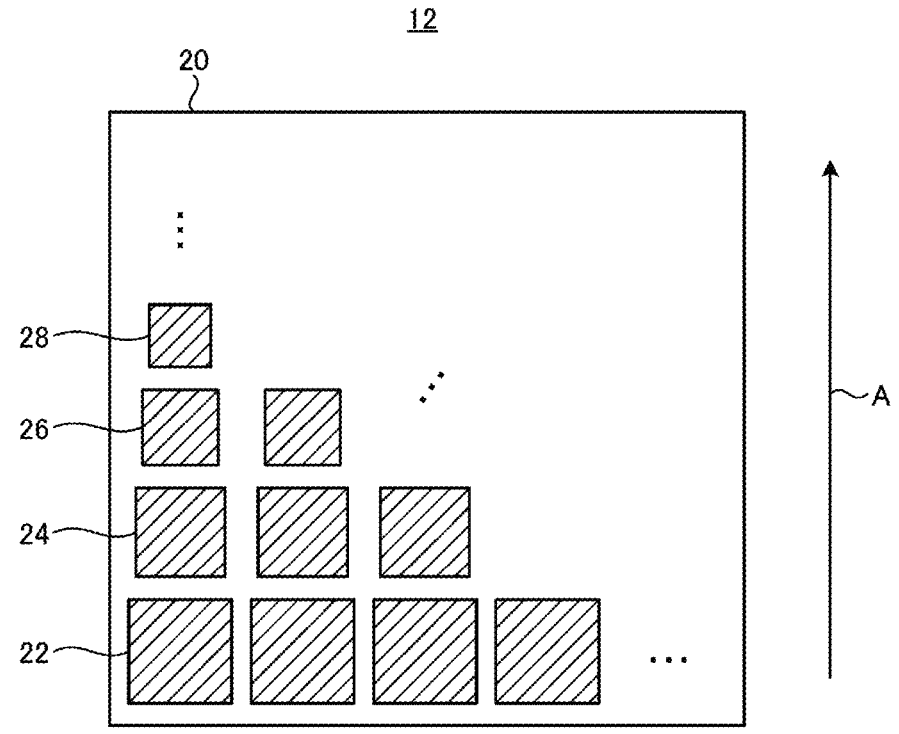
FIG. 3 is a diagram schematically illustrating an example of a radio wave refracting plate according to the first embodiment.

FIG. 3 is a diagram schematically illustrating an example of the radio wave refracting plate 12. As illustrated in FIG. 3, the radio wave refracting plate 12 may include a substrate 20, elements 22, elements 24, elements 26, and elements 28, for example.

The elements 22, the elements 24, the elements 26, and the elements 28 may be formed on the substrate 20. The substrate 20 may have a rectangular shape of 30 cm×30 cm, for example, but is not limited thereto. The elements 22, 24, 26, and 28 may be two-dimensionally arranged on the substrate 20. Specifically, in FIG. 3, a plurality of elements 22 may be arranged in a line in the bottom row of the substrate 20. In the substrate 20, a plurality of elements 24 may be arranged in a line in a row above the row where the elements 22 are arranged. In the substrate 20, a plurality of elements 26 may be arranged in a line in a row above the row where the elements 24 are arranged. In the substrate 20, a plurality of elements 28 may be arranged in a line in a row above the row where the elements 26 are arranged. In the substrate 20, a plurality of elements 22 may be arranged in a line in a row above the row where the elements 28 are arranged. In other words, the radio wave refracting plate 12 may have a structure in which a plurality of elements having different sizes are periodically arranged. The elements 22 to 28 may be different in the frequency band of the radio wave to be changed and the amount of change in the phase. The elements 22 to 28 have the rectangular shapes, without limitation. The frequency band of the radio wave to be refracted and the amount of change in the phase can be adjusted by varying the sizes and shapes of the element 22, the element 24, and the element 26, and the element 28.

Return to FIG. 2. The relay apparatus 14 is configured to perform wireless communication with a terminal apparatus 16 located in the room R, based on the refractive radio wave W2 received from the radio wave refracting plate 12, for example. The terminal apparatus 16 may be a communication apparatus including a smartphone. The relay apparatus 14 may be configured to emit radio waves toward a whole of the room R in performing millimeter wave communication for the 5G, the 6G, or the like with the terminal apparatus 16, for example. The relay apparatus 14 may be configured to emit a beam toward the terminal apparatus 16 in performing millimeter wave communication for the 5G, the 6G, or the like with the terminal apparatus 16, for example. The relay apparatus 14 may be configured to wirelessly communicate with the terminal apparatus 16 using Wi-Fi, for example.

Communication Method

Figure 4:
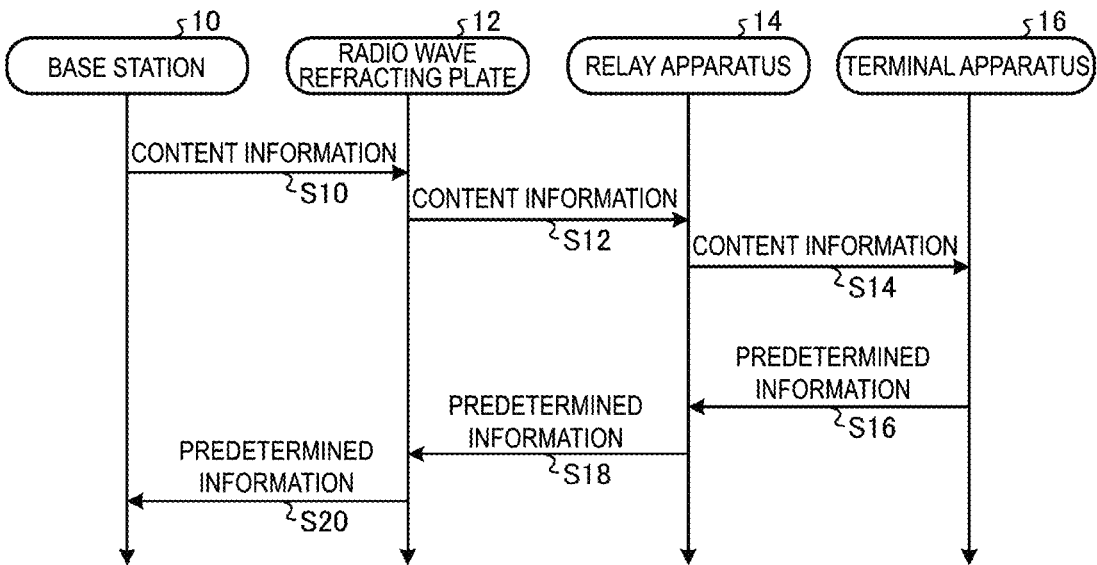
FIG. 4 is a sequence diagram illustrating an example of a flow of processing for a communication system according to the first embodiment.

A description is given of a communication method of the communication system according to the first embodiment using FIG. 4. FIG. 4 is a sequence diagram illustrating an example of a flow of processing for the communication system according to the first embodiment.

The processing illustrated in FIG. 4 illustrates, for example, as illustrated in FIG. 2, processing of communication between the base station 10 and the terminal apparatus 16 incapable of directly receiving millimeter waves from base station 10, in millimeter wave communication using millimeter waves for the 5G, the 6G, or the like.

The base station 10 transmits, to the radio wave refracting plate 12, a radio wave of millimeter waves including content information related to various contents such as video, music, and audio (step S10). The radio wave refracting plate 12 refracts the radio wave of millimeter waves including the content information received from the base station 10 to transmit as a refractive radio wave of millimeter waves including the content information to the relay apparatus 14 (step S12). The relay apparatus 14, when receiving the refractive radio wave of millimeter wave from the radio wave refracting plate 12, transmits the content information included in the refractive radio wave by using millimeter waves, Wi-Fi or the like to the terminal apparatus 16 (step S14). Accordingly, the communication system 1 can guide the content information transmitted from the base station 10 to the terminal apparatus 16.

The communication system 1 can also transmit predetermined information from the terminal apparatus 16 to the base station 10. For example, the terminal apparatus 16 transmits the predetermined information to be transmitted to the base station 10 to the relay apparatus 14 by using millimeter waves, Wi-Fi, or the like (step S16). The relay apparatus 14 outputs the radio wave of millimeter waves including the predetermined information received from the terminal apparatus 16 to the radio wave refracting plate 12 (step S18). The radio wave refracting plate 12 refracts the radio wave of millimeter waves including the predetermined information received from the relay apparatus 14 to transmit as a refractive radio wave of millimeter waves including the predetermined information to the base station 10 (step S20). Accordingly, the communication system 1 can guide the predetermined information transmitted from the terminal apparatus 16 to the base station 10.

Configuration of Base Station

Figure 5:
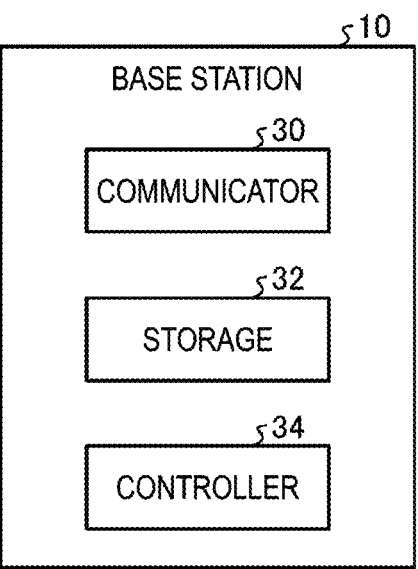
FIG. 5 is a block diagram illustrating a configuration example of a base station according to the first embodiment.

A description is given of a configuration of the base station according to the first embodiment using FIG. 5. FIG. 5 is a block diagram illustrating a configuration example of the base station according to the first embodiment.

As illustrated in FIG. 5, the base station 10 includes a communicator 30, a storage 32, and a controller 34, for example.

The communicator 30 is a wireless communication interface performing wireless communication with an external apparatus. In the first embodiment, the communicator 30 is configured to wirelessly communicate with the relay apparatus 14, the terminal apparatus 16, or the like. The communicator 30 corresponds to millimeter wave communication for the 5G, the 6G, or the like, for example.

The storage 32 is a memory storing various types of information. The storage 32 is configured to store information such as arithmetic content and a program of the controller 34, for example. The storage 32 may include at least one selected from the group consisting of, for example, a RAM (random access memory), a primary storage device such a ROM (read only memory), and an external storage device such as an HDD (hard disk drive).

The controller 34 is configured to control an operation of each unit in the base station 10. The controller 34 is implemented by, for example, a CPU (central processing unit), an MPU (micro processing unit), and the like executing the program stored in the storage 32 on the RAM (random access memory) or the like used as a work space. The controller 34 may be implemented by, for example, an integrated circuit such as an ASIC (application specific integrated circuit) or a FPGA (field programmable gate array). The controller 34 may be implemented in a combination of hardware and software.

Configuration of Relay Apparatus

Figure 6:
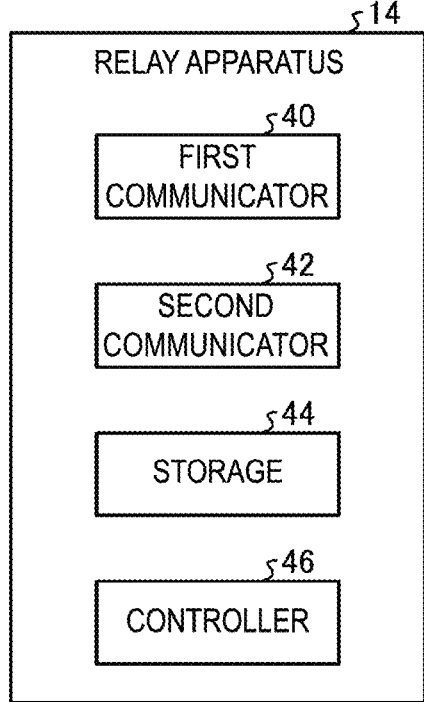
FIG. 6 is a block diagram illustrating a configuration example of a relay apparatus according to the first embodiment.

A description is given of a configuration of the relay apparatus according to the first embodiment using FIG. 6. FIG. 6 is a block diagram illustrating a configuration example of the relay apparatus according to the first embodiment.

As illustrated in FIG. 6, the relay apparatus includes a first communicator 40, a second communicator 42, a storage 44, and a controller 46.

The first communicator 40 is a wireless communication interface performing wireless communication with an external apparatus. In the first embodiment, the first communicator 40 is configured to wirelessly communicate with the base station 10, the terminal apparatus 16, or the like. The first communicator 40 corresponds to millimeter wave communication for the 5G, the 6G, or the like, for example.

The second communicator 42 is a wireless communication interface performing wireless communication with an external apparatus. In the first embodiment, the second communicator 42 is configured to wirelessly communicate with the terminal apparatus 16. The second communicator 42 corresponds to short-range wireless communication such as Wi-Fi, for example. Note that when the relay apparatus 14 communicates with the terminal apparatus 16 using millimeter waves, the second communicator 42 may not be necessarily provided.

The storage 44 is a memory storing various types of information. The storage 44 is configured to store information such as arithmetic content and a program of the controller 46, for example. The storage 44 includes at least one selected from the group consisting of, for example, a RAM, a primary storage device such a ROM, and an external storage device such as an HDD.

The controller 46 is configured to control an operation of each unit in the base station 10. The controller 46 is implemented by, for example, a CPU, an MPU, and the like executing the program stored in the storage 44 on the RAM or the like used as a work space. The controller 46 may be implemented by an integrated circuit such as an ASIC or a FPGA, for example. The controller 46 may be implemented in a combination of hardware and software.

As described above, in the first embodiment, the communication system 1 is configured to refract the radio wave of millimeter waves transmitted from the base station 10 by use of the radio wave refracting plate 12 to guide to the relay apparatus 14 installed in the room R in which it is difficult to perform communication using millimeter waves. Accordingly, in the first embodiment, communication using millimeter waves can be appropriately performed by using the radio wave refracting plate 12 and the relay apparatus 14 even in an out-of-coverage area. In the first embodiment, the radio wave refracting plate 12 only needs to be arranged between the base station 10 and the relay apparatus 14, so communication using millimeter waves can be easily performed even in an out-of-coverage area.

In the first embodiment, the radio wave refracting plate 12 can refract and emit the radio wave of millimeter waves transmitted from the base station 10 to be converged to the relay apparatus 14. Accordingly, in the first embodiment, communication using millimeter waves can be more appropriately performed even in an out-of-coverage area.

In the first embodiment, communication using millimeter waves is performed in the room R in an out-of-coverage area, so the access point does not need to be provided. Accordingly, in the first embodiment, a power supply for the access point is not required, which is advantageous in terms of cost.

In the first embodiment, a work for making a hole in the house or the like is not required for drawing the optical communication line and the like to the room R for performing high-speed communication. Accordingly, in the first embodiment, an effort or the like of the work of construction is not taken, which is advantageous in terms of cost.

Variation of First Embodiment

Figure 7:
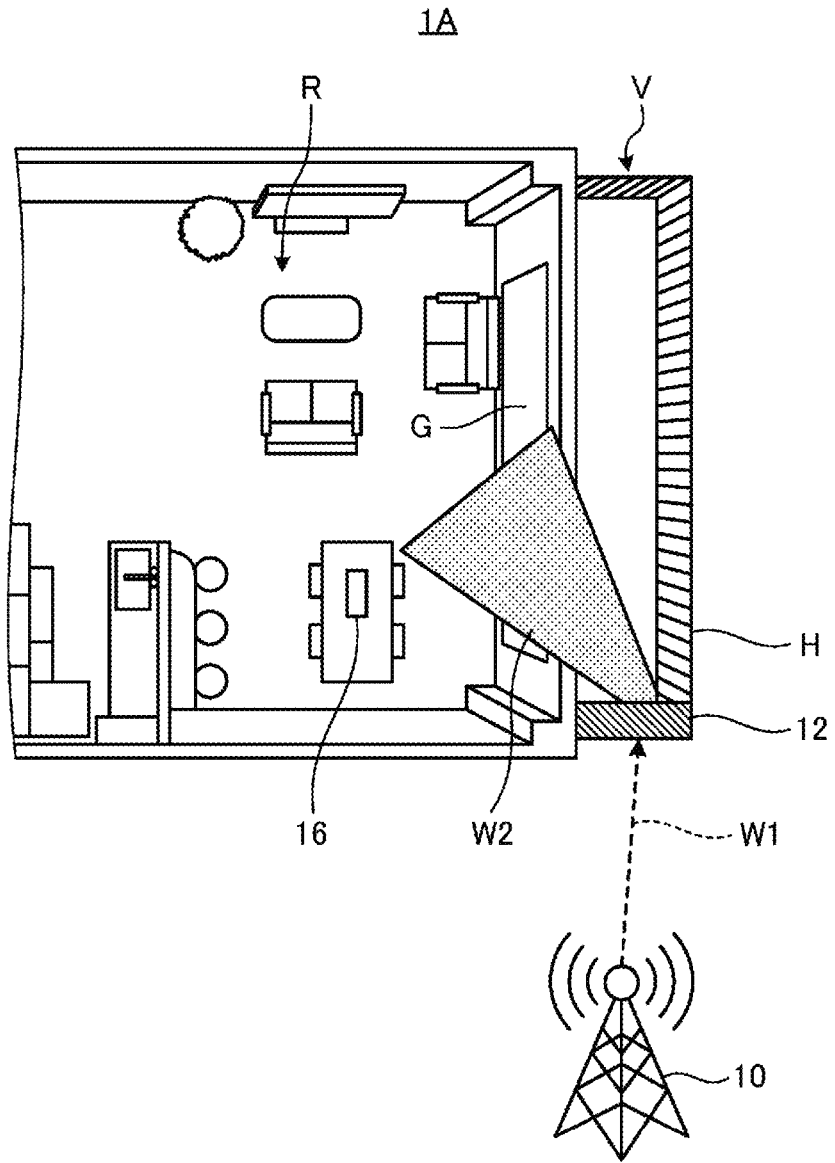
FIG. 7 is a diagram for describing an example of a wireless communication system according to a variation of the first embodiment.

A description is given of a variation of the first embodiment using FIG. 7. FIG. 7 is a diagram for describing an example of a wireless communication system according to the variation of the first embodiment.

As illustrated in FIG. 7, a communication system 1A includes the base station 10 and the radio wave refracting plate 12. The communication system 1A differs from the communication system 1 illustrated in FIGS. 1 and 2 in that the communication system 1A does not include the relay apparatus 14.

In the variation of the first embodiment, the radio wave refracting plate 12 may be installed at a position where visibility when viewing the base station 10 and the whole of the room R is good, for example. The radio wave refracting plate 12 may be configured to emit the radio wave received from the base station 10 as a refractive radio wave toward inside the room R. The radio wave refracting plate 12 may be configured, for example, to emit the radio wave received from the base station 10 as a refractive radio wave to be spread to the whole of the room R in a horizontal direction of the room R.

The radio wave refracting plate 12 may be designed such that a beam width in a horizontal direction of the refractive radio wave W2 is wider than a beam width in a vertical direction. In this case, a large range area of the room R can be covered and the radio waves are not unnecessarily spread in the vertical direction, and thus, the terminal apparatus 16 can receive large electrical power to efficiently perform communication.

The radio wave refracting plate 12 may be designed such that the refractive radio waves W2 converge, and have a focal point near a window frame of the window glass G or between the glass and the glass. When the window frame is non-metal, even if the window glass is made of a material having a high attenuation such as heat reflecting glass or heat absorbing glass, the refractive radio wave W2 passes through the window frame portion through which the radio wave is likely to pass, and thus the radio waves efficiently penetrate indoors to allow stable communication. The radio wave refracting plate 12 may be designed to allow convergence to one point, or may be designed to allow convergence to a line segment along the window frame of the window glass G. A direction of the line segment is preferred in the vertical direction. In this case, a radio wave intensity distribution does not unnecessarily spread indoors, and thus, the terminal apparatus 16 can receive large electrical power to efficiently perform communication. A location where the refractive radio wave W2 converges is preferably an end of the window glass G on a side closer to the radio wave refracting plate 12. This makes it possible to efficiently implement a communication area in the whole of the room R.

In the variation of the first embodiment, the terminal apparatus 16 is configured to receive the refractive radio wave from the radio wave refracting plate 12 to receive the radio wave transmitted from the base station 10. In other words, the communication system 1A is configured to guide the content information transmitted from the base station 10 directly to the terminal apparatus 16 via the radio wave refracting plate 12. The terminal apparatus 16 transmits the radio waves including the predetermined information to the radio wave refracting plates 12 to transmit the radio waves to the base station 10. In other words, the communication system 1A is configured to guide the predetermined information transmitted from the terminal apparatus 16 directly to the base station 10 via the radio wave refracting plate 12.

As described above, in the variation of the first embodiment, the communication system 1A is configured to refract the radio wave of millimeter waves transmitted from the base station 10 by use of the radio wave refracting plate 12 to guide to the room R in which it is difficult to perform communication using millimeter waves. Accordingly, in the first embodiment, communication between the base station 10 and the terminal apparatus 16 using millimeter waves can be appropriately performed by using the radio wave refracting plate 12 even in an out-of-coverage area.

Second Embodiment

Figure 8:
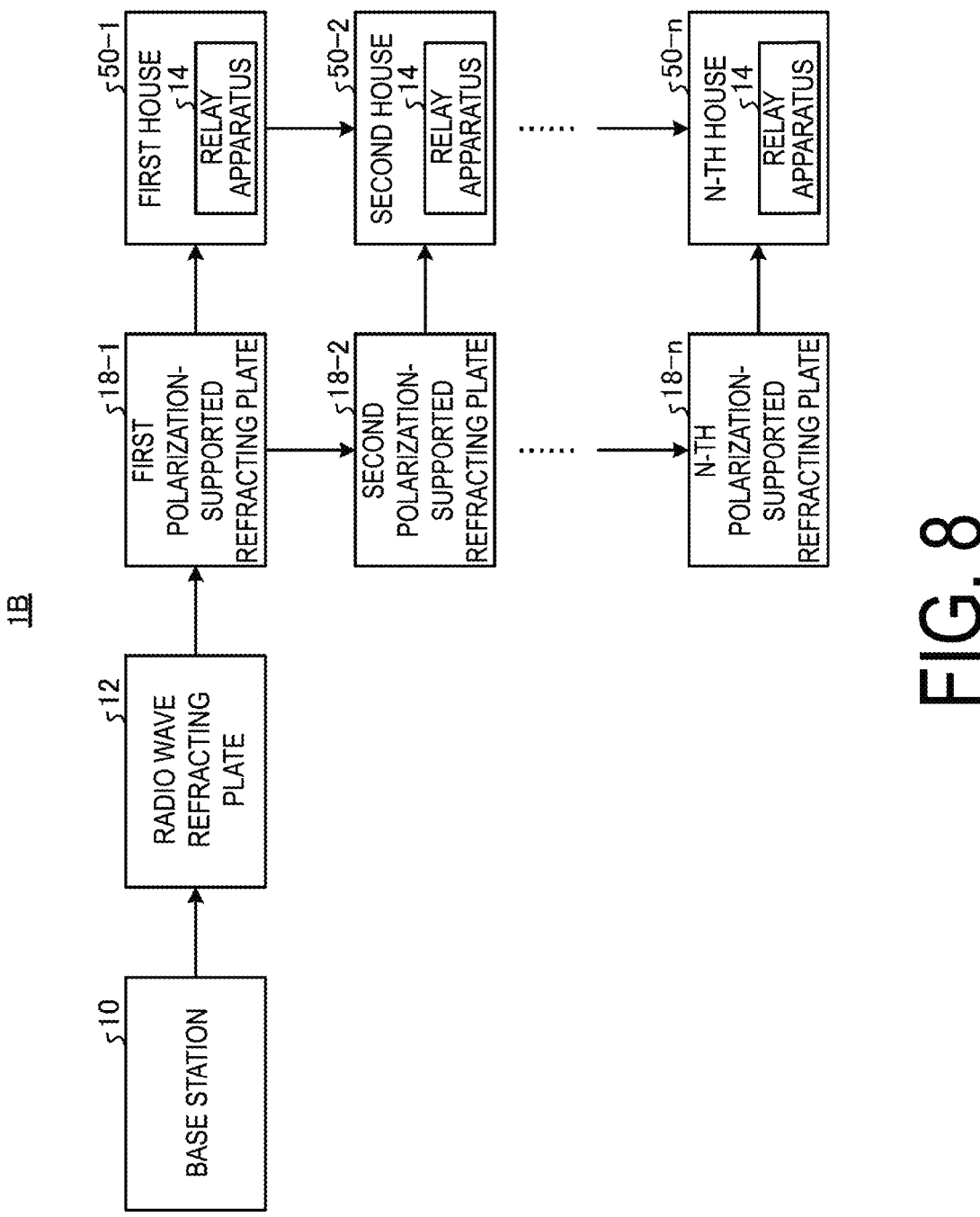
FIG. 8 is a block diagram illustrating a configuration example of a wireless communication system according to second embodiment.

A description is given of a wireless communication system according to a second embodiment using FIG. 8. FIG. 8 is a block diagram illustrating a configuration example of the wireless communication system according to the second embodiment.

As illustrated in FIG. 8, a communication system 1B includes the base station 10, the radio wave refracting plate 12, the relay apparatus 14 installed in each of a first house 50-1 to a n-th house 50-n (n is an integer of 2 or more), and a first polarization-supported refracting plate 18-1 to a n-th polarization-supported refracting plate 18-n. The first polarization-supported refracting plate 18-1 to the n-th polarization-supported refracting plate 18-n, if not necessarily distinguished, may be collectively referred to as the polarization-supported refracting plate 18. The first house 50-1 to the n-th house 50-n, if not necessarily distinguished, may be collectively referred to as the house 50.

Figure 9:
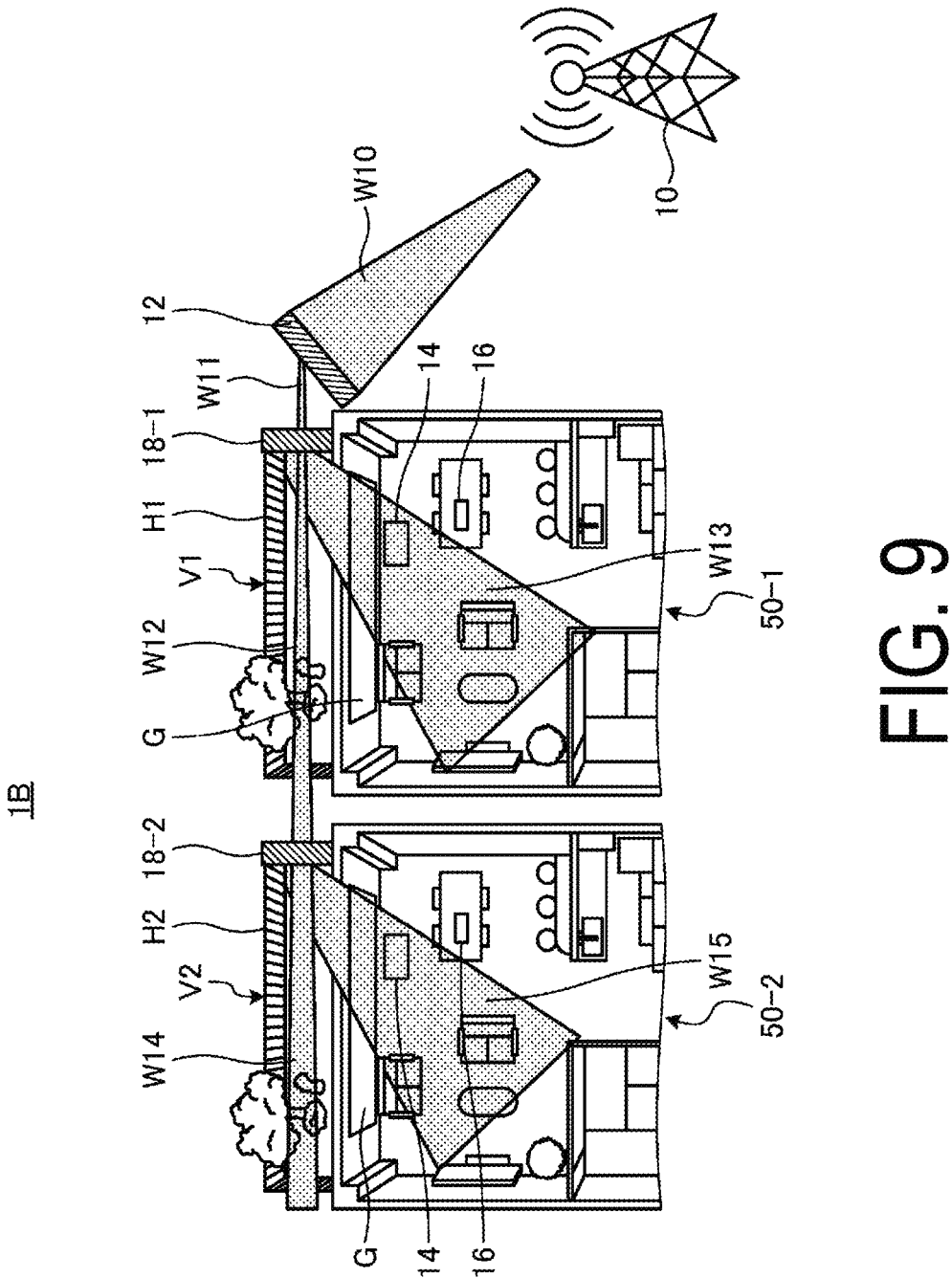
FIG. 9 is a diagram for describing an example of the wireless communication system according to the second embodiment.

A description is given of an example of the wireless communication system according to the second embodiment using FIG. 9. FIG. 9 is a diagram for describing an example of the wireless communication system according to the second embodiment.

FIG. 9 illustrates the first house 50-1 and the second house 50-2. The first house 50-1 and the second house 50-2 may be rooms next to each other in the collective housing. The first polarization-supported refracting plate 18-1 is installed in a balcony V1 in the first house 50-1. The second polarization-supported refracting plate 18-2 is installed in a balcony V2 in the second house 50-2. The first polarization-supported refracting plate 18-1 and the second polarization-supported refracting plate 18-2 may be fixed to a handrail H1 and a handrail H2, respectively, so as not to be blown by, for example, wind.

In the second embodiment, a radio wave W10 from the base station 10 is refracted, by the radio wave refracting plate 12, as a refractive radio wave W11 in parallel to a surface of the window glass G on a side of the respective balconies V. The radio wave W10 from the base station 10 contains a vertical polarization and a horizontal polarization. Hereinafter, a description is given assuming that the radio wave W10 from the base station 10 is a vertical polarization or a horizontal polarization, but the present disclosure is not limited thereto. The radio wave refracting plate 12 may be configured to also refract a radio wave of an inclined polarization.

The radio wave refracting plate 12 is configured to refract the radio wave W10 from the base station 10 in a direction of the first polarization-supported refracting plate 18-1. The radio wave refracting plate 12 includes a plurality of structures designed to have a refractive angle for each different frequency band at which refractive angle a radio wave incident in a direction of a line connecting the base station 10 with the radio wave refracting plate 12 is refracted to a direction of a line connecting the radio wave refracting plate 12 with the first polarization-supported refracting plate 18-1. Note that a plurality of radio wave refracting plates 12 may be disposed for different frequency bands.

The first polarization-supported refracting plate 18-1 includes a plurality of structures designed to have a refractive angle for each different frequency band at which refractive angle a radio wave incident in a direction of a line connecting the radio wave refracting plate 12 with the first polarization-supported refracting plate 18-1 is refracted to a direction of a line connecting the first polarization-supported refracting plate 18-1 with the room of the first house 50-1. Note that a plurality of first polarization-supported refracting plates 18-1 may be disposed for different frequency bands.

The second polarization-supported refracting plate 18-2 includes a plurality of structures designed to have a refractive angle for each different frequency band at which refractive angle a radio wave incident in a direction of a line connecting the first polarization-supported refracting plate 18-1 with the second polarization-supported refracting plate 18-2 is refracted to a direction of a line connecting the second polarization-supported refracting plate 18-2 with the room of the first house 50-1. Note that a plurality of second polarization-supported refracting plates 18-2 may be disposed for different frequency bands.

Specifically, the first polarization-supported refracting plate 18-1 receives the refractive radio wave W11 from the radio wave refracting plate 12. The first polarization-supported refracting plate 18-1 passes therethrough at least a part of the vertical polarization and the horizontal polarization contained in the refractive radio wave W11, as a passed-through radio wave W12. The first polarization-supported refracting plate 18-1 passes therethrough at least a part of the vertical polarization and the horizontal polarization contained in the refractive radio wave W11, as a refractive radio wave W13 in a direction toward the inside of the room of the first house 50-1. In the first house 50-1, the refractive radio wave W13 is relayed to the relay apparatus 14 via the window glass G to enable millimeter wave communication, for example.

The second polarization-supported refracting plate 18-2 receives the passed-through radio wave W12 from first polarization-supported refracting plate 18-1. The second polarization-supported refracting plate 18-2 passes therethrough at least a part of the vertical polarization and the horizontal polarization contained in the passed-through radio wave W12, as a passed-through radio wave W14. The second polarization-supported refracting plate 18-2 passes therethrough at least a part of the vertical polarization and the horizontal polarization contained in the passed-through radio wave W12, as a refractive radio wave W15 in a direction toward the inside of the room of the second house 50-2. In the second house 50-2, the refractive radio wave W15 is relayed to the relay apparatus 14 via the window glass G to enable millimeter wave communication, for example.

In the second embodiment, the polarization-supported refracting plate 18 is installed so that a radio wave area can be created even in a room where visibility of the base station 10 from the window glass G of the room is poor so long as the rooms are at the same floor in the collective housing.

A configuration of the radio wave refracting plate 12 and the polarization-supported refracting plate 18 according to the second embodiment will be described in detail.

The radio wave refracting plate 12 has a configuration same as, and/or similar to, the radio wave refracting plate 12 illustrated in FIG. 3. In this case, the direction A may be a direction parallel to a plane defined by a line connecting the base station 10 with the radio wave refracting plate 12 and a line connecting the radio wave refracting plate 12 with the first polarization-supported refracting plate 18-1.

Figure 10:
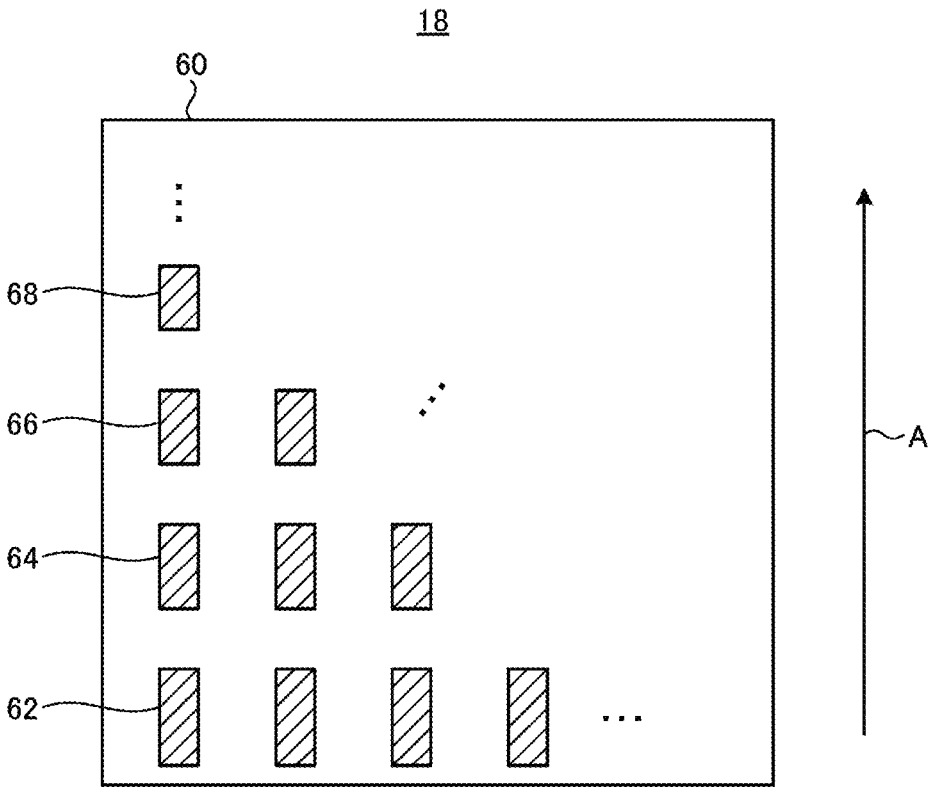
FIG. 10 is a diagram schematically illustrating an example of a polarization-supported refracting plate 18 according to the second embodiment.

FIG. 10 is a diagram schematically illustrating an example of the polarization-supported refracting plate 18 according to the second embodiment. As illustrated in FIG. 10, the polarization-supported refracting plate 18 may include a substrate 60, elements 62, elements 64, elements 66, and elements 68, for example. As illustrated in FIG. 10, the elements 62, the elements 64, the element 66s, and the elements 68 are formed in a rectangular shape. In other words, the polarization-supported refracting plate 18 may be configured such that the phase changes only with respect to a polarization in the direction A, and the phase does not change with respect to a polarization orthogonal to the direction A.

As illustrated in FIG. 10, the polarization-supported refracting plate 18 may include unit structures (elements) two-dimensionally arranged on a plane. The unit structures may be arranged such that the phase changes along the direction A when a carrier passes through the polarization-supported refracting plate 18. In the case of the first polarization-supported refracting plate 18-1 illustrated in FIG. 9, the direction A may be a direction parallel to a plane defined by a line connecting the radio wave refracting plate 12 with the first polarization-supported refracting plate 18-1 and a line connecting the first polarization-supported refracting plate 18-1 with the first house 50-1. In the case of the second polarization-supported refracting plate 18-2 illustrated in FIG. 9, the direction A may be a direction parallel to a plane defined by a line connecting the first polarization-supported refracting plate 18-1 with the second polarization-supported refracting plate 18-2 and a line connecting the second polarization-supported refracting plate 18-2 with the second house 50-2. The polarization-supported refracting plate 18 is designed to not only refract but also diffuse the radio wave of a polarization incident from the base station 10. A length of one side of the polarization-supported refracting plate 18 is preferably configured to be smaller than $2L \cdot \tan(w)$ where w (deg) represents a half width of an antenna (not illustrated) of the base station 10 and L (m) represents a distance between the base station 10 and the radio wave refracting plate 12.

Concrete Example of Polarization-Supported Refracting Plate

Figure 11:
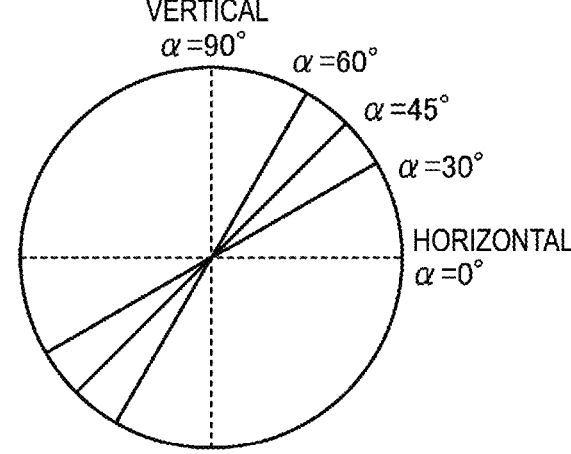
FIG. 11 is a diagram for describing an operational polarization angle according to the second embodiment.

In the second embodiment, the polarization-supported refracting plate 18 is designed to have an operational polarization angle α in a range from 0° to 90°. FIG. 11 is a diagram for describing the operational polarization angle according to the second embodiment. As illustrated in FIG. 11, α=0° corresponds to the horizontal polarization, and α=90° corresponds to the vertical polarization. In the second embodiment, the operating polarization angle α can be designed to have any value to change a ratio of electrical powers of the radio waves propagating in a refractive direction and a direct traveling direction. Note that, as described above, the radio waves radiated by the base station 10 contain the polarizations of both the vertical polarization and the horizontal polarization.

Figure 12:
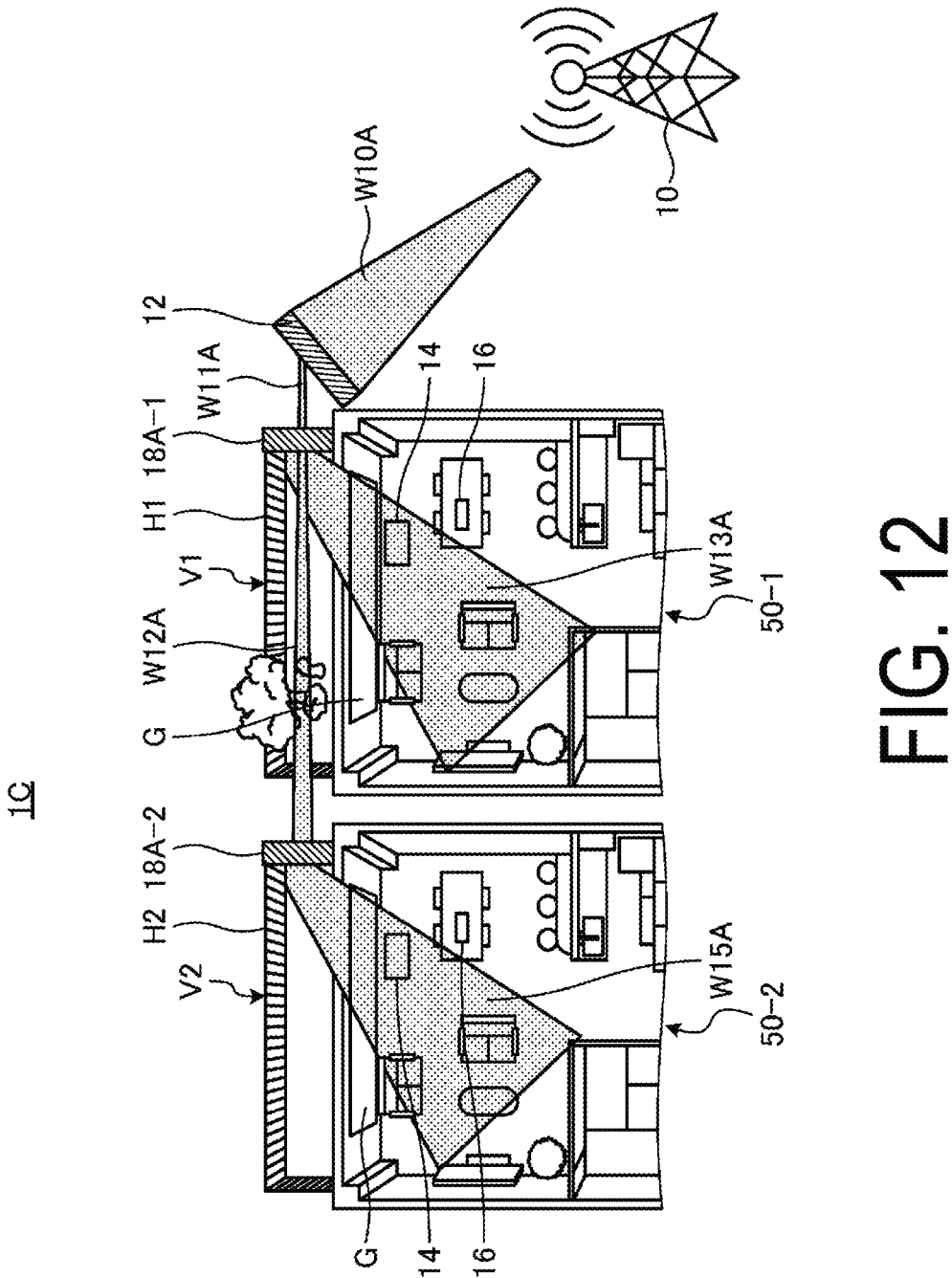
FIG. 12 is a diagram for describing an example of a communication system according to a first variation of the second embodiment.

A description is given of a communication system according to the second embodiment in changing the operational polarization angle α using FIG. 12. FIG. 12 is a diagram for describing an example of a communication system according to a first variation of the second embodiment.

FIG. 12 illustrates an example of propagating radio waves from the base station to two houses of the first house 50-1 and the second house 50-2. A first polarization-supported refracting plate 18A-1 is installed in the balcony V1 in the first house 50-1. A second polarization-supported refracting plate 18A-2 is installed in the balcony V2 in the second house 50-2.

The radio wave refracting plate 12 refracts a radio wave W10A from the base station 10 to emit as a refractive radio wave W11A to the first polarization-supported refracting plate 18A-1. Assume that the refractive radio wave W11A has 50% of the vertical polarization components and 50% of the horizontal polarization components of the total.

Assume that the first polarization-supported refracting plate 18A-1 is designed to have the operational polarization angle α of 0°, for example. In other words, the first polarization-supported refracting plate 18A-1 is designed to refract the horizontal polarization only. The first polarization-supported refracting plate 18A-1 makes all components of the vertical polarization of the refractive radio wave W11, as a passed-through radio wave W12A, go straight in the direction of the second polarization-supported refracting plate 18A-2. The passed-through radio wave W12A contains only the vertical polarization. An electrical power of the passed-through radio wave W12A is 50% of the electrical power of the refractive radio wave W11A. The first polarization-supported refracting plate 18A-1 refracts all components of the horizontal polarization of the refractive radio wave W11, as a refractive radio wave W13A, in the direction of the room of the first house 50-1. The refractive radio wave W13A contains only the horizontal polarization. An electrical power of the refractive radio wave W13A is 50% of the electrical power of the refractive radio wave W11A.

Assume that the second polarization-supported refracting plate 18A-2 is designed to have the operational polarization angle α of 90°, for example. In other words, the second polarization-supported refracting plate 18A-2 is designed to refract the vertical polarization only. In this case, since the passed-through radio wave W12A contains only the vertical polarization, the second polarization-supported refracting plate 18A-2 refracts the entire passed-through radio wave W12A, as a refractive radio wave W15A, in the direction of the room of the second house 50-2. An electrical power of the refractive radio wave W15A is 50% of the electrical power of the refractive radio wave W11A.

The operating polarization angles α of the first polarization-supported refracting plate 18A-1 and the second polarization-supported refracting plate 18A-2 are designed as illustrated in FIG. 12, so that the electrical power of the refractive radio wave W11A can be efficiently propagated evenly to the first house 50-1 and the second house 50-2.

Figure 13:
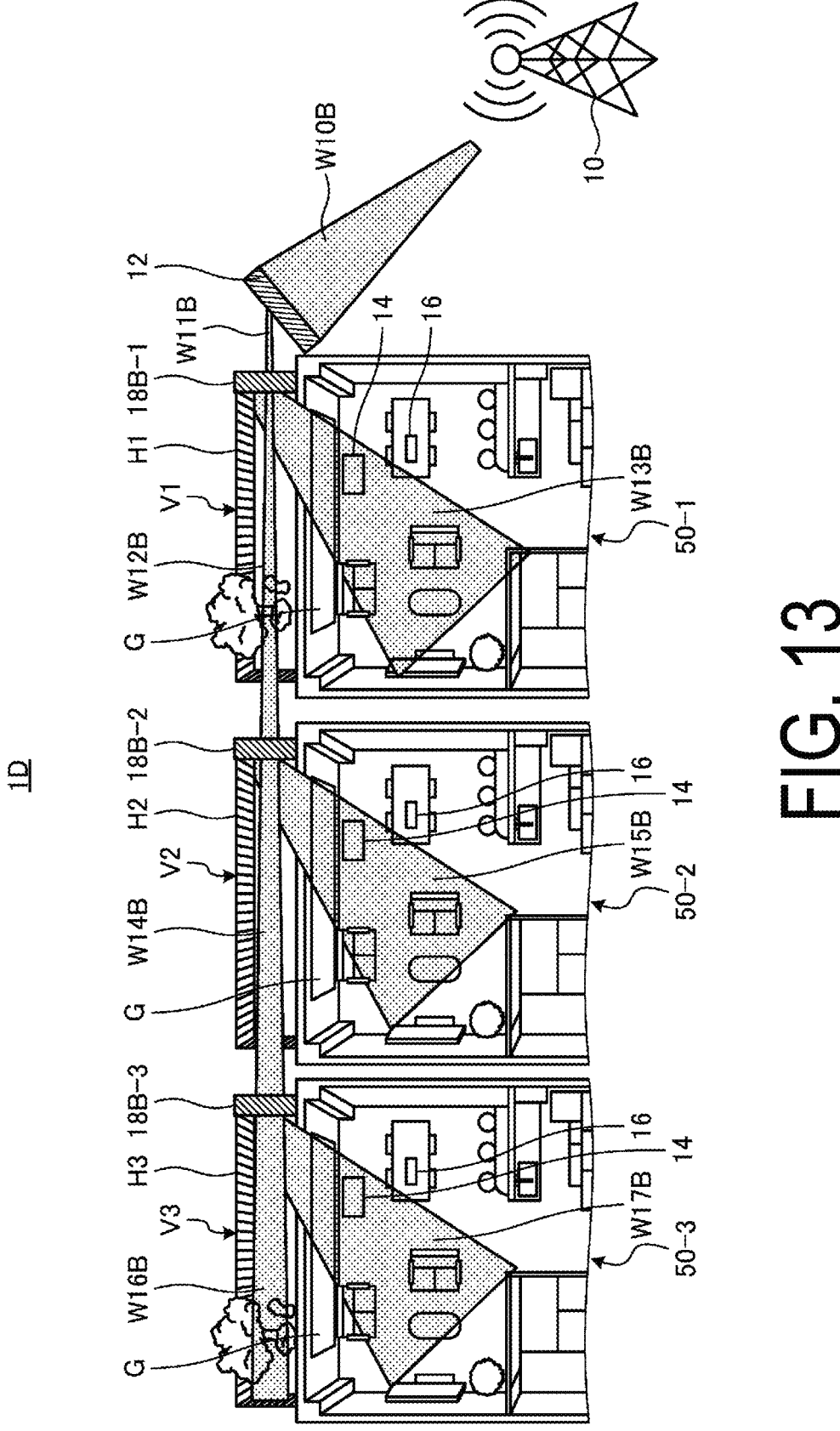
FIG. 13 is a diagram for describing an example of a communication system according to a second variation of the second embodiment.

A description is given of an example of a communication system according to a second variation of the second embodiment using FIG. 13. FIG. 13 is a diagram for describing an example of the communication system according to the second variation of the second embodiment.

FIG. 13 illustrates an example of propagating radio waves from the base station to three houses of the first house 50-1, the second house 50-2, and the third house 50-3. A first polarization-supported refracting plate 18B-1 is installed in the balcony V1 in the first house 50-1. A second polarization-supported refracting plate 18B-2 is installed in the balcony V2 in the second house 50-2. A third polarization-supported refracting plate 18B-3 is installed in a balcony V3 in the third house 50-3.

The radio wave refracting plate 12 refracts a radio wave W10B from the base station 10 to emit as a refractive radio wave W11B to the first polarization-supported refracting plate 18B-1. Assume that the refractive radio wave W11B has 50% of the vertical polarization components and 50% of the horizontal polarization components of the total.

Assume that the first polarization-supported refracting plate 18B-1 is designed to have the operational polarization angle α of 45°, for example. In other words, the first polarization-supported refracting plate 18B-1 is designed to refract halves of both the vertical polarization and the horizontal polarization of the received radio wave. The first polarization-supported refracting plate 18B-1 makes the halves of both the vertical polarization and the horizontal polarization of the refractive radio wave W11B, as a passed-through radio wave W12B, go straight in a direction of the second polarization-supported refracting plate 18B-2. Assume that the passed-through radio wave W12B has 25% of the vertical polarization components and 25% of the horizontal polarization components of the total. An electrical power of the passed-through radio wave W12B is 50% of the electrical power of the refractive radio wave W11B. The first polarization-supported refracting plate 18B-1 refracts halves of both the vertical polarization and the horizontal polarization of the refractive radio wave W11B, as a refractive radio wave W13B, in the direction of the room of the first house 50-1. Assume that the refractive radio wave W13B has 25% of the vertical polarization components and 25% of the horizontal polarization components of the total. An electrical power of the refractive radio wave W13B is 50% of the electrical power of the refractive radio wave W11B.

Assume that the second polarization-supported refracting plate 18B-2 is designed to have the operational polarization angle α of 45°, for example. The second polarization-supported refracting plate 18B-2 makes halves of both the vertical polarization and the horizontal polarization of the passed-through radio wave W12B, as a passed-through radio wave W14B, go straight in a direction of the third polarization-supported refracting plate 18B-3. Assume that the passed-through radio wave W14B has 13% of the vertical polarization components and 13% of the horizontal polarization components of the total. An electrical power of the passed-through radio wave W14B is 25% of the electrical power of the refractive radio wave W11B. The second polarization-supported refracting plate 18B-2 refracts halves of both the vertical polarization and the horizontal polarization of the passed-through radio wave W12B, as a refractive radio wave W15B, in the direction of the room of the second house 50-2. Assume that the refractive radio wave W15B has 13% of the vertical polarization components and 13% of the horizontal polarization components of the total. An electrical power of the refractive radio wave W15B is 25% of the electrical power of the refractive radio wave W11B.

Assume that the third polarization-supported refracting plate 18B-3 is designed to have the operational polarization angle α of 45°, for example. The third polarization-supported refracting plate 18B-3 makes halves of both the vertical polarization and the horizontal polarization of the passed-through radio wave W14B, as a passed-through radio wave W16B go straight. Assume that the passed-through radio wave W16B has 6% of the vertical polarization components and 6% of the horizontal polarization components of the total. An electrical power of the passed-through radio wave W14B is 13% of the electrical power of the refractive radio wave W11B. The third polarization-supported refracting plate 18B-3 refracts halves of both the vertical polarization and the horizontal polarization of the passed-through radio wave W14B, as a refractive radio wave W17B, in the direction of the room of the third house 50-3. Assume that the refractive radio wave W17B has 6% of the vertical polarization components and 6% of the horizontal polarization components of the total. An electrical power of the refractive radio wave W17B is 13% of the electrical power of the refractive radio wave W11B.

The operating polarization angles α of the first polarization-supported refracting plate 18B-1 to the third polarization-supported refracting plate 18B-3 are designed as illustrated in FIG. 13, so that the electrical power of the refractive radio wave W11B can be propagated to the first house 50-1 to the third house 50-3. In the case illustrated in FIG. 13, the electrical power intensity is made to be half each time propagating to the next house.

The first polarization-supported refracting plate 18B-1 to the third polarization-supported refracting plate 18B-3 illustrated in FIG. 13 are described as having the same operating polarization angle α, but the present disclosure is not limited thereto. The operational polarization angles α of the first polarization-supported refracting plate 18B-1 to the third polarization-supported refracting plate 18B-3 may be different from each other.

The first polarization-supported refracting plate 18B-1 may be designed to have the operational polarization angle α of 30°, for example. In this case, the passed-through radio wave W12B may have 38% of the vertical polarization components and 13% of the horizontal polarization components of the total. The electrical power of the passed-through radio wave W12B is 50% of the electrical power of the refractive radio wave W11B. The refractive radio wave W13B may have 13% of the vertical polarization components and 38% of the horizontal polarization components of the total. The electrical power of the refractive radio wave W13B is 50% of the electrical power of the refractive radio wave W11B.

The second polarization-supported refracting plate 18B-2 may be designed to have the operational polarization angle α of 60°, for example. In this case, the passed-through radio wave W14B may have 14% of the vertical polarization components and 5% of the horizontal polarization components of the total. The electrical power of the passed-through radio wave W14B is 19% of the electrical power of the refractive radio wave W11B. The refractive radio wave W15B may have 23% of the vertical polarization components and 8% of the horizontal polarization components of the total. The electrical power of the refractive radio wave W15B is 31% of the electrical power of the refractive radio wave W11B.

The third polarization-supported refracting plate 18B-3 may be designed to have the operational polarization angle α of 45°, for example. In this case, the passed-through radio wave W16B may have 9% of the vertical polarization components and 0% of the horizontal polarization components of the total. The electrical power of the passed-through radio wave W16B is 9% of the electrical power of the refractive radio wave W11B. The refractive radio wave W17B may have 5% of the vertical polarization components and 5% of the horizontal polarization components of the total. The electrical power of the refractive radio wave W17B is 9% of the electrical power of the refractive radio wave W11B.

As illustrated in FIGS. 12 and 13, each ratio of the electrical powers can be roughly estimated by decomposing the polarization contained in the radio wave from the base station 10 into the vertical components and the horizontal components in accordance with the operating polarization angle α. Specifically, in the second embodiment, the design can be made to effectively distribute the electrical power in accordance with the magnitude of the electrical power received from the base station 10, the number of households drawing the radio waves, the use case, or the like. Thus, the second embodiment can freely build the system.

Stability of Radio Wave Refracting Plate

A description is given of stability of the radio wave refracting plate 12 according to the present disclosure. Conventionally, a reflector has been known that is formed of a metal plate or the like in order to bend the radio waves from the base station 10 in a desired direction such as that of a terminal apparatus or the like. However, the reflector has a problem that the travel direction of the radio wave after reflection is sensitive to an installation angle, so it is difficult to adjust the angle during the installation. Therefore, the reflector installed outdoors is rocked by wind to cause a problem that the communication state becomes unstable.

Figure 14:
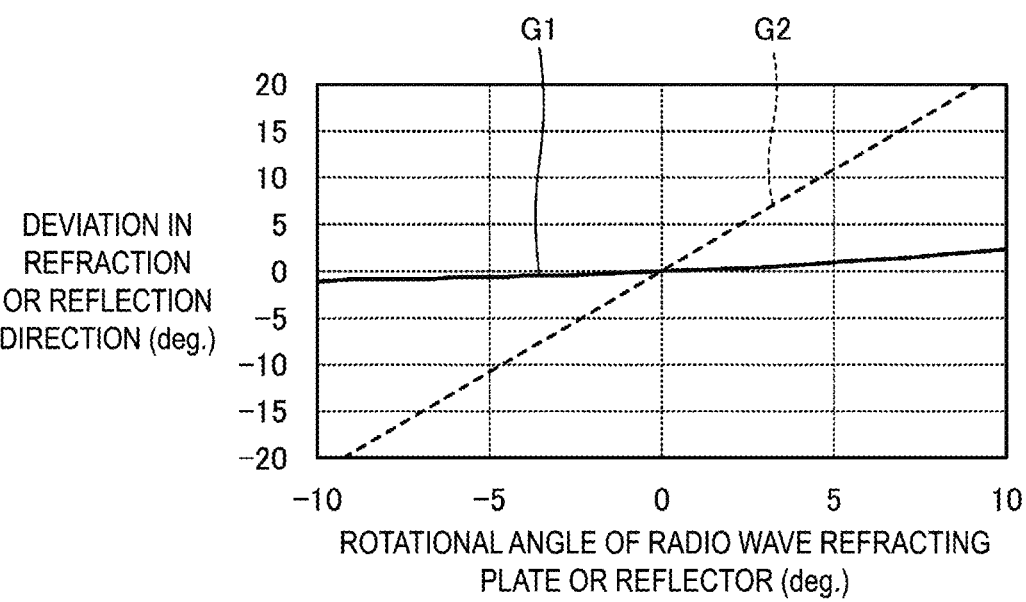
FIG. 14 is a graph illustrating a relationship between a rotational angle of the radio wave refracting plate and a traveling direction of the radio wave.

A rotational angle of the radio wave refracting plate 12 and the traveling direction of the radio wave are described using FIG. 14. FIG. 14 is a graph illustrating a relationship between a rotational angle of a radio wave refracting plate and a traveling direction of a radio wave. A graph G1 shows characteristics when a radio wave is vertically incident on the radio wave refracting plate 12 designed to have a refractive angle of 30°. A graph G2 shows characteristics when the vertically incident radio wave is vertically incident on a reflector reflecting a radio wave in a direction of a reflection angle of 30°. FIG. 14 illustrates a horizontal axis indicates the rotational angle of the radio wave refracting plate 12 or the reflector, and a vertical axis indicates a deviation of the radio wave in the refractive direction or the reflection direction. FIG. 14 illustrates the deviations in the refractive direction or the reflection direction with the rotational angle in a range of −10° to 10° with respect to the incident radio wave. In FIG. 14, the deviation in the refractive direction or in the reflection direction of 30° is 0° when the rotational angle is 0°.

As shown in the graph G1, the radio wave refracting plate 12 has little change in the refractive angle, for example, even when the radio wave refracting plate 12 rotates in the range of −10° to 10° with reference to 0° with respect to the radio wave received, for example.

On the other hand, as shown in the graph G2, when the reflector is rotated in the range of −10° to 10°, the reflection angle changes greatly. For example, when the reflector is rotated 5°, the reflection angle changes by 10°. Specifically, when the reflector rotated Δθ° after the installation, the reflection direction of the radio wave deviates by 2Δθ°. In this case, the radio wave incident on the metal reflector at an incident angle of θ° is reflected at the reflection angle of θ°, and thus the angle formed by the incident wave and the reflective wave is 2θ°. As a result, the Δθ° inclination with respect to the incident wave causes the incidence angle of θ°+Δθ° and the reflective wave of θ°+Δθ°, and the angle formed by the incident wave and the reflective wave is 2θ°+2Δθ°.

Note that, although not illustrated in FIG. 14, when the relay antenna is installed instead of the reflector, the relay antenna rotates Δθ° after the installation, the traveling direction of the radio wave deviates by Δθ°. Furthermore, since the incident direction deviates by Δθ°, the gain is significantly reduced when the installation is made with the maximum gain for the base station direction.

Figure 15:
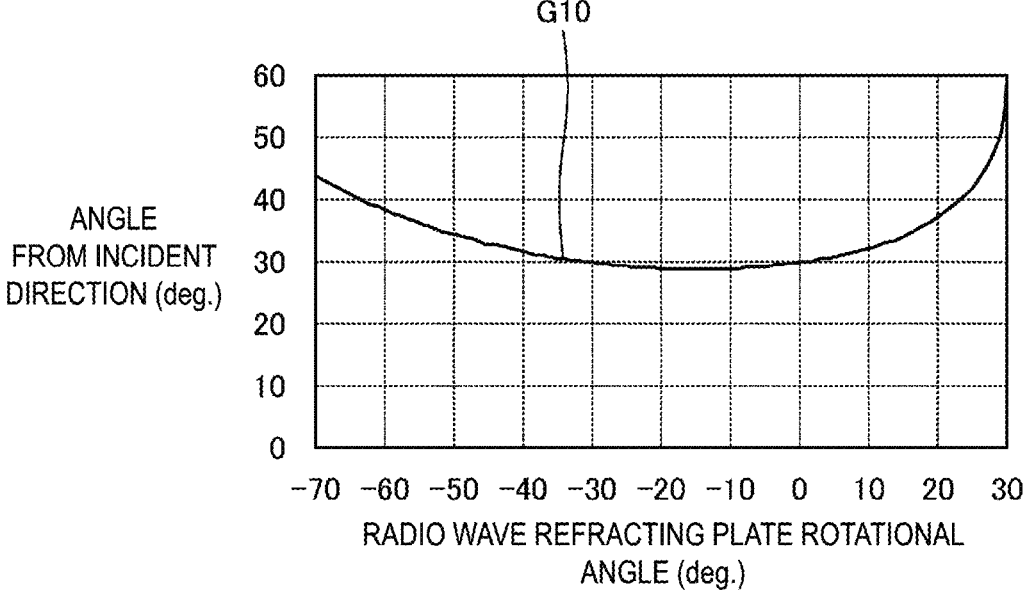
FIG. 15 is a graph for describing changes in a refractive angle with respect to the rotational angle of the radio wave refracting plate.

FIG. 15 is a graph for describing changes in the refractive angle with respect to the rotational angle of the radio wave refracting plate. A graph G10 shows characteristics of the radio wave refracting plate 12. FIG. 15 illustrates the change in the refractive angle with the rotational angle in a range of −70° to 30° with respect to the incident radio wave. Note that in the example illustrated in FIG. 15, the radio wave refracting plate 12 is designed to have a refractive angle of 30°. In FIG. 15, the radio wave refracting plate 12 is in a direction perpendicular to the incident direction of the radio wave when the rotational angle is 0°, and is in a direction perpendicular to the refractive direction of the radio wave when the rotational angle is −30°.

As illustrated in FIG. 15, the radio wave refracting plate 12 indicates a good characteristic with the rotational angle in a range of approximately −40° to 10° with respect to the incident direction of the radio wave. A perpendicular direction of the radio wave refracting plate 12 preferably is positioned between the incident direction of the radio wave and the refractive direction. In the example illustrated in FIG. 15, the perpendicular direction of the radio wave refracting plate 12 is preferably positioned from −30° to 0°. As a result, when the radio wave refracting plate 12 is rotated by wind or the like, the deviation of the radio wave in the refractive direction can be more reduced, and more stable communication can be achieved.

The embodiments of the present disclosure are described above, but the present disclosure is not limited to the contents of these embodiments described above. Constituent elements described above include those that can be easily conceived by a person skilled in the art, those that are substantially identical to the constituent elements, and those within a so-called scope of equivalents. The constituent components described above can be combined as appropriate. The constituent components may be variously omitted, substituted, or modified without departing from the gist of the above-described embodiments.

The invention claimed is:

1. A communication system, comprising:
  a base station configured to transmit and receive a radio wave; and
  a radio wave refracting plate configured to refract the radio wave transmitted from the base station at a predetermined angle to emit a refractive radio wave, when the radio wave passes through the radio wave refracting plate, wherein
  the radio wave refracting plate is installed in an outdoor space and is configured to emit the radio wave toward an indoor space, the radio wave refracting plate is installed on a window glass between the indoor space and the outdoor space, and configured to emit the radio wave toward the indoor space, and the radio wave refracting plate is configured according to reflective characteristics of the window glass with respect to the radio wave.

2. The communication system according to claim 1, wherein the radio wave refracting plate is configured to emit the refractive radio wave spreading throughout the indoor space in a horizontal direction of the indoor space.

3. The communication system according to claim 1, wherein the radio wave refracting plate is set at a position visible from a position of the base station.

4. The communication system according to claim 1, further comprising:

a relay apparatus configured to receive the refractive radio wave and transmit and receive data from a terminal apparatus to relay wireless communication between the base station and the terminal apparatus.

5. The communication system according to claim 4, wherein the radio wave refracting plate is installed at a position visible from positions of the base station and the relay apparatus.

6. The communication system according to claim 1, wherein the radio wave refracting plate installed has a surface direction orthogonal to an incident direction of the radio wave from the base station.

7. The communication system according to claim 1, wherein the radio wave refracting plate is configured to amplify a signal level of the radio wave received from the base station and emit the refractive radio wave.

8. The communication system according to claim 1, wherein the radio wave refracting plate is installed on a per room basis in a collective housing, and an angle of the radio wave refracting plate with respect to the base station varies depending on a position of the room in the collective housing.

9. A communication system, comprising:

a base station configured to transmit and receive a radio wave;

a radio wave refracting plate configured to refract the radio wave transmitted from the base station at a predetermined angle to emit a refractive radio wave, when the radio wave passes through the radio wave refracting plate; and a plurality of polarization-supported refracting plates, the polarization-supported refracting plates being installed on a per room basis in a collective housing, wherein a first polarization-supported refracting plate of the plurality of polarization-supported refracting plates arranged receives the refractive radio wave from the radio wave refracting plate, and the first polarization-supported refracting plate is configured to refract at least a part of the refractive radio wave in a direction toward a corresponding room in the collective housing, and pass a remaining part of the refractive radio wave as a first passed-through radio wave through the first polarization-supported refracting plate.

10. The communication system according to claim 9, wherein the plurality of polarization-supported refracting plates comprise a second polarization-supported refracting plate configured to receive the first passed-through radio wave from the first polarization-supported refracting plate, and the second polarization-supported refracting plate is configured to refract at least a part of the first passed-through radio wave in a direction toward a corresponding room in the collective housing, and pass a remaining part of the first passed-through radio wave as a second passed-through radio wave through the second polarization-supported refracting plate.

11. The communication system according to claim 9, wherein the polarization-supported refracting plate is configured to refract or pass therethrough at least one of a vertical polarization and a horizontal polarization contained in the radio wave transmitted from the base station.

12. The communication system according to claim 1, wherein the radio wave refracting plate is installed and a perpendicular line direction of the radio wave refracting plate is positioned between an incident direction in which the radio wave transmitted from the base station is incident and a refractive direction in which the radio wave is refracted.

13. A communication method comprising:

transmitting and receiving a radio wave;

refracting the radio wave at a predetermined angle to emit a first refractive radio wave, when the transmitted radio wave passes through; and refracting at least a part of the first refractive radio wave in a direction toward a room in an indoor space as a second refractive radio wave, and passing a remaining part of the first refractive radio wave as a passed-through radio wave.

14. A radio wave refracting plate installation method, comprising:

installing a radio wave refracting plate at a position visible from positions of a base station and a relay apparatus, the radio wave refracting plate being configured to refract a radio wave transmitted from the base station at a predetermined angle to emit a refractive radio wave, when the radio wave passes through the radio wave refracting plate, and the relay apparatus being configured to receive the refractive radio wave and transmit and receive data to and from a terminal apparatus to relay wireless communication between the base station and the terminal apparatus, wherein an area of the radio wave refracting plate is larger than an antenna effective area of the relay apparatus.

15. A radio wave refracting plate installation method, comprising:

installing a radio wave refracting plate at a position visible from positions of a base station and a relay apparatus, the radio wave refracting plate being configured to refract a radio wave transmitted from the base station at a predetermined angle to emit a refractive radio wave, when the radio wave passes through the radio wave refracting plate, and the relay apparatus being configured to receive the refractive radio wave and transmit and receive data to and from a terminal apparatus to relay wireless communication between the base station and the terminal apparatus, wherein a length of the radio wave refracting plate in a predetermined direction is smaller than $2L \cdot \tan(w)$ where w (deg) represents a half width of an antenna of the base station, and L (m) represents a distance between the base station and the radio wave refracting plate.

16. The radio wave refracting plate installation method according to claim 14, wherein the radio wave refracting plate is installed in an outdoor space.

17. The radio wave refracting plate installation method according to claim 16, wherein the radio wave refracting plate is installed on a window glass between an indoor space and the outdoor space.

18. The radio wave refracting plate installation method according to claim 14, wherein the radio wave refracting plate is installed and a surface direction of the radio wave refracting plate is orthogonal to an incident direction of the radio wave from the base station.

\* \* \* \* \*